United States Patent [19]
Padgett, Sr.

[11] 4,297,212
[45] Oct. 27, 1981

[54] OIL FILTER UNIT

[76] Inventor: Henry A. Padgett, Sr., Rte. 1, Monetta, S.C. 29105

[21] Appl. No.: 157,875

[22] Filed: Jun. 9, 1980

[51] Int. Cl.³ .................... B01D 27/08; F01M 1/00
[52] U.S. Cl. .................... 210/168; 210/439; 210/441; 210/443; 210/453
[58] Field of Search ........ 210/168, 438, 439, 440–444, 210/453, DIG. 17

[56] References Cited

U.S. PATENT DOCUMENTS

| | | | |
|---|---|---|---|
| 2,524,336 | 10/1950 | Vokes | 210/443 |
| 2,568,181 | 9/1951 | Zimmerman et al. | 210/435 |
| 2,661,846 | 12/1953 | Lash et al. | 210/164 |
| 2,738,879 | 3/1956 | Frantz | 210/183 |
| 2,933,192 | 4/1960 | Gretzinger | 210/316 |
| 2,951,587 | 9/1960 | Carpenter | 210/441 |
| 3,069,015 | 12/1962 | Hultgren | 210/232 |
| 3,282,429 | 11/1966 | Wood et al. | 210/136 |
| 3,370,707 | 2/1968 | Wordstrom | 210/440 |
| 3,526,590 | 9/1970 | Russo | 210/439 |
| 3,572,509 | 3/1971 | Dexter | 210/439 |
| 3,773,180 | 11/1973 | Harrison | 210/DIG. 17 |
| 4,151,823 | 5/1979 | Grosse et al. | 210/168 |

Primary Examiner—Peter A. Hruskoci
Attorney, Agent, or Firm—Luke J. Wilburn, Jr.; Wellington M. Manning, Jr.

[57] ABSTRACT

An improved oil filter unit particularly adapted for use in conventional engine oil filter fittings of automotive vehicles, wherein a filter housing having a central oil flow tube may be permanently installed on the oil fitting of the engine to provide filtered oil flow through the entire length of the filter medium disposed between the central oil flow tube and the walls of the filter housing. A removable closure cap with filter medium support means is provided for ready replacement of the disposable filter medium in the housing.

9 Claims, 4 Drawing Figures

OIL FILTER UNIT

The present invention is directed to an improved oil filter unit for an oil lubricating system of an engine, and, more particularly, to an improved oil filter unit particularly adapted for attachment to the conventional oil filter fitting on an internal combustion engine of the automotive vehicle type.

BACKGROUND OF THE INVENTION

Oil filters of various constructions and shapes are known to provide for filtration of oil in an oil circulating system.

In current internal combustion engine constructions for automotive vehicles, it is the prevailing practice to employ a standard oil filter attachment or fitting to accommodate disposable oil filter canisters which are threadably attached to and removed from the engine block in rapid and efficient manner. Such standardized fittings comprise a central oil flow pipe which is externally threaded and extends a short distance outwardly of the engine block. Oil flow passageways are provided in the engine block in radial disposition about the central threaded pipe for circulation of the engine oil through the filter canister and between the pipe and engine block passageways for filtration. The disposable filter canisters are provided with an end wall having a central opening which is internally threaded to be received on the engine oil flow pipe, and radially disposed openings about the central opening in the end wall for circulation of the oil therethrough. Such disposable oil filter canisters, although relatively simple to attach and remove from the engine block oil fitting, constitute a considerable expense in the long run operational expense of an automotive vehicle, since they are a composite unit which is totally discarded and replaced with a new canister each time the oil filter is renewed.

Certain oil filter constructions are known which comprise a filter housing with removable filter medium, and with oil inlets and outlets provided in the housing to direct flow of oil through the filter medium and return it to the oil system for use. Certain of such replaceable filter medium filter units are provided with a removable end cap for access to the filter housing to permit replacement of the filter medium periodically during use. Oil filter unit constructions having provision for replacement of the filter medium therein are disclosed in the following U.S. Patents: U.S. Pat. No. 2,661,846—Lash et al U.S. Pat. No. 2,738,879—Frantz U.S. Pat. No. 2,933,192—Gretzinger U.S. Pat. No. 2,195,587—Carpenter U.S. Pat. No. 3,069,015—Hultgren et al U.S. Pat. No. 3,282,429—Wood et al U.S. Pat. No. 3,526,590—Russo The oil filter unit constructions disclosed in the abovementioned patents generally have oil inlets and outlets in the filter housing, and end cap attachment means, which are so located and arranged as to require substantial modification of the standard oil filter fitting which is currently employed on automotive engines to accommodate the aforementioned disposable filter canisters.

OBJECTS OF THE INVENTION

It is therefore an object of the present invention to provide an improved oil filter for internal combustion engines having a standard oil filter fitting of the above described type, wherein the oil filter housing of the filter unit may be installed as a permanent feature of the engine, and wherein only the filter medium itself need be replaced in the unit, as needed, during life of the engine.

It is another object to provide an oil filter unit particularly adapted for attachment to the conventional oil fitting of an internal combustion engine of automotive vehicle type which is of simplified and more economical construction than oil filters of the known prior art.

It is a further object to provide an improved oil filter unit for attachment to conventional oil filter fittings of an internal combustion engine, wherein use and replacement of the filter medium of the unit periodically during operational life of the engine is more economical and less costly than the disposable canister type filter units currently in use.

BRIEF SUMMARY OF THE INVENTION

In its broad aspects, the present invention comprises an improved oil filter unit for use with the conventional oil fitting of an automotive internal combustion engine which presently is designed to accommodate disposable canister units, and wherein the housing of the improved filter unit is attached for permanent use on the engine block without modification of the existing engine block fitting. The filter housing is provided with a removable end cap of simplified construction to permit ready replacement of the filter medium of the unit. The filter housing which is permanently attached to the oil filter fitting of the engine has an end wall portion and an internal, centrally located oil flow tube which are secured to the threaded oil pipe of the engine fitting to provide oil flow throughout the full length of a disposable filter medium employed in the housing. Filter medium support means in the housing locates and positions the filter medium in the oil flow path through the unit.

BRIEF DESCRIPTION OF THE DRAWINGS

The above as well as other objects of the invention will become more apparent, and the invention will be better understood, by reference to the following detailed description of preferred embodiments of the invention, when taken together with the accompanying drawings, in which.

DETAILED DESCRIPTION OF EMBODIMENTS OF THE INVENTION

Figure 1:
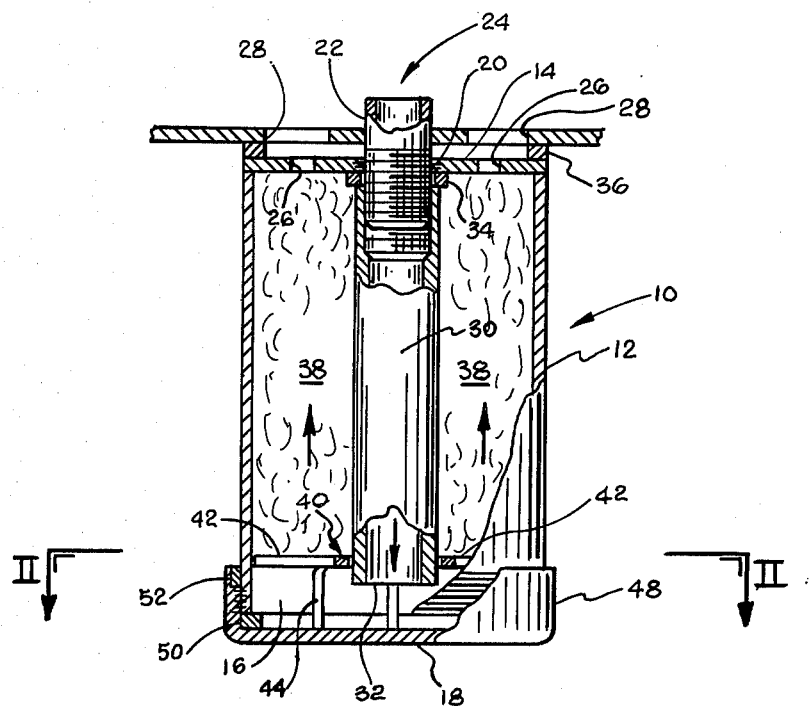
FIG. 1 is an elevation view, with portions broken away and in section, of one form of the improved oil filter unit of the present invention, with the unit shown installed for use on the conventional oil filter fitting of an engine block of an automotive internal combustion engine.

Referring more specifically to the drawings, FIG. 1 is a schematic elevation view, with portions in section, of a preferred form of the oil filter of the present invention as attached to conventional engine oil filter fitting prevalent in current automotive engine constructions. As seen, the filter unit 10 comprises a generally cylindrical filter housing 12 having an upper end wall 14 and an initially open opposite end 16 which is closed by a removable closure cap 18. Upper end wall 14 of the housing has a central, internally threaded opening 20 therethrough for reception of the end portion of an externally threaded oil flow pipe 22 of an engine block fitting, generally identified by the numeral 24. End wall 14 of filter housing 12 is also provided with a plurality of openings 26 which are radially disposed about the central threaded opening of the filter housing and communicate with the radially disposed oil flow passageways 28 in engine fitting 24.

Attached to the lower end of the engine oil flow pipe 22 is an elongate, imperforate oil flow tube 30 which extends along the central axis of the cylindrical filter housing 12 and has an open lower end 32 which terminates adjacent the lower end 16 of the housing. The upper end of the oil flow tube is internally threaded so as to be rotatably received on the engine oil pipe, and a lock washer 34 may be provided between the end wall of the housing and the end of the tube to lock the housing and tube firmly in place on the engine block fitting and resist removal of the housing by counter-rotation about the pipe.

The upper surface of end wall 16 of housing 12 is provided with a ring gasket 36 located outside the oil flow openings 26 in the end wall to provide a fluid-tight seal between the engine block and the filter housing unit.

As seen in FIG. 1, disposed about the central oil flow tube 30 of the filter housing and completely filling the space between the tube and the cylindrical wall of the housing is a disposable filter medium 38, which preferably is composed of a porous polymeric foam material of deformable spongy construction. Although the preferred composition of the filter medium is a synthetic plastic porous foam material, other materials of suitable shape and proper porosity for oil filtration may be utilized in the filter unit.

Located at the lower end portion of oil flow tube 30 in surrounding relation thereto are filter medium support means, shown as a wire or plastic frame 40 comprising radially extending arms 42 (FIG. 2) which engage the bottom end of the filter medium 38, and depending legs 44 which engage the inside surface of end cap 18 to support the filter medium in spaced relation above the lower end of the oil flow tube, thus ensuring that the lower end of tube 30 is not blocked by the filter medium during flow of oil through the filter unit.

The lower end portion of the cylindrical filter housing is externally threaded, and the closure cap 18 of the filter unit is provided with a circular flanged portion 48 which overlies the end of the housing 12 and is internally threaded to be rotatably secured to the filter housing. Sealing means, shown as two spaced ring gaskets 50, 52 are provided on the closure cap to engage the bottom edge and side wall portions of the filter housing, respectively, and thus ensure fluid-tight seal of the cap on the housing during use of the filter unit. Filter housing 12, closure cap 18, and oil flow tube 30 are formed of suitable rigid, corrosion-resistant material, such as metal, plastic, or the like, to provide long life and wear resistance of the unit during use.

As indicated by arrows in FIG. 1, flow of oil from the engine through the filter unit proceeds downwardly from engine oil pipe 22 through imperforate central oil flow tube 30 of the housing to the lower open end thereof where the path of the oil then reverses to flow upwardly through the full length of the filter medium 38 before returning to the engine block passageways 28 through radial openings 26 in the end wall of the housing, thus ensuring optimum use of the filter medium for filtration by passage of the oil through the full length of the same.

Figure 2:
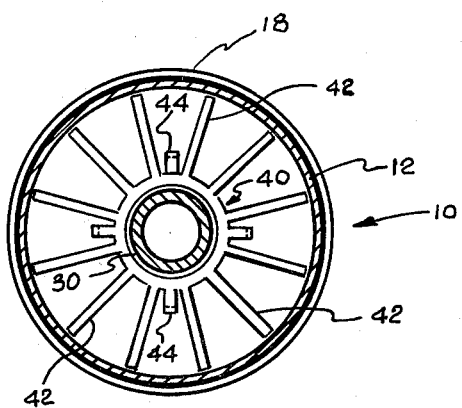
FIG. 2 is a horizontal sectional view of the improved filter taken generally along line II—II of FIG. 1, and looking in the direction of the arrows.

In initial installation of the oil filter unit of FIGS. 1 and 2, the cylindrical housing 12 of the unit is rotatably secured to the central oil pipe 22 of the engine fitting to provide fluid-tight seal between the oil flow passageways of the oil fitting and the radially disposed openings in the upper end wall of the filter housing. Thereafter, oil flow tube 30 of the filter unit is rotatably attached to the threaded end portion of oil pipe 22, with the lock washer 34 being provided between the upper end of the tube and the end wall of the housing, if necessary, to prevent counter-rotational movement of the housing and tube from the engine fitting during periodic removal of the end cap 18 for filter medium replacement. The disposable filter medium is inserted into the filter housing and the filter medium support frame 40 and closure cap 18 are appropriately located in and secured to the lower open end of the housing unit. Thereafter, during operation of the engine, the filter medium of the unit may be periodically removed and replaced with a clean filter medium by removal of the end cap, with the filter housing unit being maintained at all times on the engine oil filter fitting as a permanent installation therewith.

Figure 3:
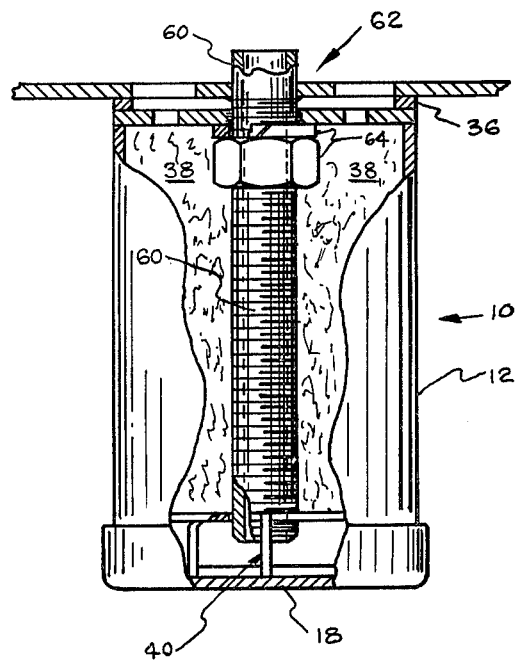
FIG. 3 is an elevation view, with portions in section, of the improved oil filter unit, showing a modified form of structural attachment of the filter to a modified form of engine oil fitting.

FIG. 3 illustrates a modified form of the oil filter unit of the present invention which may be attached for permanent use to certain engine oil filter fittings wherein the externally threaded oil pipe 60 of the fitting 62 is of sufficient length to also serve as the central oil flow tube of the filter unit 10. In such case, the separate housing tube 30, as identified in FIGS. 1 and 2, may be omitted, and the filter housing secured against counter-rotation by provision of only a lock washer and nut 64.

Figure 4:
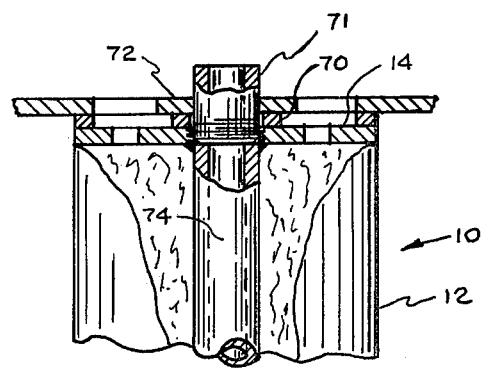
FIG. 4 is an elevation view, with portions in section, of a portion of the oil filter unit showing a further modified form of attachment of the filter unit to an engine oil filter fitting.

FIG. 4 shows a further modified form of attachment of the filter unit of the present invention to the engine block fitting, wherein a lock washer 70 is employed on oil tube 71 between the upper end wall 14 of the housing and the wall 72 of the engine block to preclude its counter-rotational movement during removal of the closure cap from the housing. In such modification, the central tube 74 of the filter housing may be permanently or removably attached to the upper end wall of the housing to provide a central flow path for the oil between opposite ends of the housing.

From the foregoing description of embodiments of the present invention, it can be seen that the improved oil filter unit is of simplified, economical construction, and provides means for permanent attachment of the filter housing directly to a conventional engine block filter fitting for long term use of the filter housing. With the filter unit of the present invention, it only is necessary to replace the relatively inexpensive filter medium for continued long life filtration of the oil lubricating system of the engine.

That which is claimed is:

1. An improved oil filter unit for use with an oil lubricating system of an engine having a filter-receiving fitting which includes a central, threaded oil flow pipe and oil flow passageway means radially disposed thereabout for circulating engine oil from the engine through the filter unit attached thereto; said filter unit comprising a generally cylindrical filter housing having an end wall and an initially open opposite end for receiving a disposable filter medium therein, said end wall having a central opening therethrough for receiving the oil pipe of the engine fitting, and a plurality of openings radially disposed about said central opening for communicating with the oil flow passageway means of the engine fitting to permit circulation of oil into and out of the housing, elongate tube means in said housing extending from said end wall opening along the central axis of the housing and terminating in an open end adjacent the initially open end of the housing, a generally cylindrical disposable filter medium with central opening therethrough supportably received in said housing around and along the length of said tube means in engagement with the outer surface of the tube means and inner surface of the cylindrical wall of the housing, a closure cap threadably received on the open end of said cylindrical housing in fluid-tight relationship therewith, said tube means, filter housing, and closure cap defining an elongate oil flow path between the central opening of the housing end wall and the radially disposed openings of the end wall for circulating oil through the length of said filter medium for filtration thereby, gasket means on the outside of the housing end wall disposed radially outwardly of said end wall openings to sealingly engage the housing with the engine, filter medium support means adjacent the open end portion of said elongate tube means to supportably position the filter medium within the housing above the open end of the tube and in spaced relation from the closure cap, and means for securing the filter housing to the engine fitting flow pipe to maintain it thereon during removal of the closure cap for replacement of a filter medium in the housing.

2. A filter unit as defined in claim 1 wherein said filter medium is composed of a polymeric foam material.

3. A filter unit as defined in claim 1 wherein said filter medium support means comprises a support frame engageable with the end of said filter medium adjacent the end portion of the housing tube and with the inside surface of said closure cap to supportably position the filter medium above the end of the tube and in spaced relation from the closure cap.

4. A filter unit as defined in claim 3 wherein said filter medium support frame comprises a wire frame surrounding the tube means and having radially extending finger portions for supportably engaging the end of the filter medium, and depending leg portions extending from adjacent the open end portion of the tube into engagement with said closure cap.

5. A filter as defined in claim 1 wherein said central opening of the end wall of the housing is internally threaded and is rotatably secured to the externally threaded oil flow pipe of the engine fitting, and wherein said means for securing the filter housing to the engine fitting includes locking means received on the threaded oil flow pipe of the engine fitting in engagement with said housing end wall to resist rotational movement of the housing thereabout.

6. A filter unit as defined in claim 5 wherein said locking means comprises a lock washer positioned about said oil flow pipe in engagement with said housing end wall, and an internally threaded portion of said tube means threadably engaged with said oil pipe with said lock washer positioned between said tube means and end wall.

7. A filter unit as defined in claim 5 wherein said locking means includes a lock washer on the engine oil pipe positioned between the housing end wall and the adjacent surface of the engine fitting.

8. A filter unit as defined in claim 5 wherein said elongate tube means comprises an externally threaded extension of the engine oil pipe and said locking means comprises a lock washer and nut threadably secured on said oil pipe extension in engagement with the end wall of the housing.

9. A filter unit as defined in claim 1 wherein said closure cap includes a flanged portion overlying the end wall portion of said filter housing, and spaced ring gasket means on said closure cap for sealingly engaging the side wall and end of the filter housing.

* * * * *